United States Patent [19]

Smith

[11] Patent Number: 4,810,533

[45] Date of Patent: Mar. 7, 1989

[54] SURFACE TREATMENT PROCESS FOR POROUS SOLIDS

[76] Inventor: Albert B. Smith, 5803 Mira Serena Dr., El Paso, Tex. 79912

[21] Appl. No.: 115,856

[22] Filed: Nov. 2, 1987

[51] Int. Cl.$^4$ .......................... B05D 3/00; B05D 3/12
[52] U.S. Cl. .................................... 427/292; 427/299; 427/314; 427/385.5; 427/393.6
[58] Field of Search ............... 427/292, 299, 309, 314, 427/385.5, 393.6, 140

[56] References Cited

U.S. PATENT DOCUMENTS

| | | | |
|---|---|---|---|
| 2,902,388 | 9/1959 | Szukiewicz | 427/393.6 |
| 3,795,533 | 3/1974 | Gauri | 427/299 |
| 4,211,804 | 7/1980 | Brizzolara | 427/385.5 |
| 4,620,989 | 11/1986 | Stiegler | 427/294 |
| 4,710,560 | 12/1987 | Vu | 427/385.5 |

FOREIGN PATENT DOCUMENTS 52-66520  6/1977  Japan .................................. 427/292

*Primary Examiner*—Sadie Childs
*Attorney, Agent, or Firm*—Walter G. Marple, Jr.; John E. Kidd; Nicholas L. Coch

[57] ABSTRACT

The present process results in a surface which is impermeable and resistant to the action of chemical substances and heat. Natural stones such as marble, travertine, granite and structural and ornamental works made out of these stones are protected from atmospheric and chemical process of degradation by a novel method of sanding down the surface with an industrial diamond abrasive to open up the pores of these solids; rinsing with water, removing water with a chemical solvent and wiping with a tack cloth to remove microchips. A protective mixture in the form of a moisture-cured polyurethane is then applied to the surface of the stones. The moisture-cured polyurethane acts as a sealant for the pores of the stones and as a chemical polish on the surface of the stones, such sealant being impermeable and resistant to the action of stains produced by chemical substances.

5 Claims, No Drawings

SURFACE TREATMENT PROCESS FOR POROUS SOLIDS

BACKGROUND OF THE INVENTION

This invention relates to an improved method for the treatment of inorganic materials. In particular, the invention relates to the treatment of natural stones. Over the years many different methods for treating natural stones, have been proposed. Stone surfaces were polished by the standard mechanical method and various sealers applied. No sealer was truly effective because the sealers could not penetrate the pores of the solids and thus they did not form a good bond. The penetration of these sealers were not efficient and had to be constantly reapplied. Consequently, over the years some stones suffer serious decay due to exposure to atmospheric chemical reaction. Water vapor in conjunction with carbon dioxide, hydrogen oxide, hydrogen sulfide, sulphur dioxide, citric acid, hydrochloric acid, etc., attack the natural stone surface. The results of this attack on the surface lead to intrinsic deterioration of the stones and items made out of these stones, such as statues, table tops, vanities, marble sinks, registration desk tops, etc.

Recently various methods for treating inorganic porous solids have been disclosed in patents which are based on the concept of preventing the decay of natural stones. For example, in Price, U.S. Pat. No. 4,478,911, treatment of a porous inorganic material is suggested using a single phase liquid mixture comprising alkoxysilane, water, organic solvent and a sylanol polymerization catalyst. While somewhat effective for materials having large pore size, it is ineffective for low porosity materials such as marble in which a high viscosity media such as the liquid mixture mentioned in this patent tends to diffuse outwardly during curing, especially in the smallest pores of the solid. Therefore, it is desirable to render a method for deeply impregnating such low porosity material which is not dependent upon the viscosity of the mixture to force penetration. Another method for treating inorganic porous solids using an impregnating sealer has been suggested in Stiegler, U.S. Pat. No. 4,620,989, which describes a method of impregnating the surface of a stone with an acrylic based resin dispersion to seal off the pores of the stone. The dispersion is force-dried using dry air in a drying system which is intended to push the resin deeper into the pores. While somewhat satisfactory for highly porous materials such as sandstone, this method does not work for solids of low porosity, such as marble. The drawback of this method is that large amounts of the dispersion must be applied, a process which risks clogging up the pores of low porosity materials. An improvement on the method stated in U.S. Pat. No. 4,629,989, is the application of a dispersion that will not clog up the pores and which is allowed to penetrate without force drying in accordance with this present invention.

In a further suggestion for treating inorganic porous solids as shown in Gauri, U.S. Pat. No. 3,795,533, using a plurality of solvent mixtures, a sequence of solvent mixtures are applied to the surface of the solids. Each of the sequentially impregnated mixtures contains a higher concentration of curable polymeric material than the previously applied impregnated mixtures. The drawback of this method is that the pores being impregnated have not been sufficiently opened for the acceptance of the multilayered cure. Therefore the polymers suggested in this method may not be capable of deeply penetrating the pores of the solid.

Some of the known methods entail techniques for coating the surfaces of porous solids, particularly marble, and for the exclusion of moisture by applying water repellant surface sealants. However, it is believed that these prior art methods of treatment of natural inorganic solids have been inadequate because if sufficient drying does not occur, water trapped beneath the surface can cause further deterioration by absorbing gases such as $CO_2$ and $SO_2$. In contrast, the present invention comprises a method to prevent water from inhibiting polymerization or curing in resin and preventing contaminants from deteriorating the surface seal by using a chemical solution to force a regulated deep drying to occur prior to application of the sealant.

SUMMARY OF THE INVENTION

The present invention provides an improved method of treating inorganic porous solids such as marble, limestone, granite, travertine and other natural stone with a single phase liquid mixture that increases the stone's durability for long periods of time.

The present invention comprises the use of industrial abrasives such as diamond, to remove existing stains, waxes and polish from the surface of natural stones. A chemical polymer, such as a moisture-cured polyurethane, is applied to the surface of natural stones, to seal the pores and to acquire a chemical finish instead of a mechanical factory finish, thereby eliminating the need to mechanically polish the stone with buffing and acids, as is done in the known method.

The present process increases the durability of natural stones and prevents chipping, cracking, discoloration and staining. According to this invention, the moisture-cured sealant not only seals the pores of a porous solid, but acts as the polishing agent as well. Using this process, we can now chemically polish the surface of porous solids and the surface is protected from deterioration for long periods of time. The novel process is further accomplished by honing the surface of the porous solid prior to application of the moisture-cured polyurethane. This step allows the pores to be open so that the polyurethane can penetrate and bond. Ample time is allowed in order for the mixture to sufficiently diffuse into the pores. Once diffusion and natural drying occurs, the mixture forms a hard, evenly glossy surface.

The process will not work on a polished surface because it cannot penetrate the pores. It is therefore necessary to have the solid honed first with the use of an industrial diamond [or any other abrasive] to open up the pores. The grit of the abrasive to be used depends on the porosity of the solid. Afterwards, the surface is cleaned free of debris by rinsing with water followed by the application of a chemical solution to remove water from deep within the pores. The surface is then wiped clean of marble microchips with the use of a tack cloth. Finally, a sealer is applied which will level the surface to a smooth finish.

It has been proven that virtually any porous solid with large pore area size will be impregnated more easily than porous solids with low pore area size. The present invention is well suited for any porous solid. It is particularly well suited for marble which is low in porosity. The present method can be used both for refurbishing existing marble and achieving a chemical finish of new marble. The method can also be used to treat such other natural stones as travertine, limestone, and granite.

DESCRIPTION OF THE PREFERRED EMBODIMENT

The present invention involves a novel process for treating inorganic porous solids such as marble, limestone, granite, travertine and other natural stones which have been damaged due to exposure to atmospheric pollutants. Using the present invention, the deterioration of new works made of natural stone can be avoided.

As will become apparent, an improved treatment has now been devised which gives rise to a water repellant barrier beneath the surface of a porous solid which also strengthens the internal bond which may have become weakened by decay.

The method comprises the following steps:

1. An inorganic porous solid, i.e. natural stone, is first treated with an industrial solvent to remove any existing stains, waxes and polishes.

2. Various grits of industrial diamond abrasives are used to sand the surface of the stone in order to open up the pores, and simultaneously, further removing any existing stains and all of the surface polish.

3. Next, the stone is rinsed with a natural lubricant, such as water, to remove all detritus and loose particles.

4. The stone is now dried using a chemical solution comprising 80% Xylene; 15% Butyl acetate; 5% [MIBK] Methyl-ISO-Butyl-Ketone and 0.1% moisture absorbing additive. The use of such a compound ensures the complete removal of all moisture that may remain in the pores and on the surface as a result of rinsing with water. Appropriate application of this solution may be achieved with the use of a brush.

5. At this point, a tack cloth is used to remove marble microchips from the surface of the stone.

6. Once the entire surface of the stone is completely free of moisture and marble microchips, a chemical polymer consisting of a moisture-cured polyurethane compound having formula $C_3H_7NO_2$ is introduced on the surface of the stone.

Appropriate application of the moisture-cured polyurethane may be achieved with the use of application rollers especially for lateral surfaces, brushes or spray nozzles. The sealant will level the surface to a smooth finish.

Subsequent to the application of the moisture-cured polyurethane compound, the stone is allowed to naturally dry at room temperature.

The advantages offered by the use of the sealant, according to the present invention are the following:

(a) it is water repellant, (b) said mixture is heat and weather resistant and is permanently stable, (c) it will penetrate and bond even the most minute pores, (d) it is a sealant and a polishing agent, (e) it creates a dense barrier coating to withstand severe weathering and marine environments, (f) it increases the durability of the stone to help prevent chipping, cracking, and discoloration.

(g) it prevents a porous solid's surface from staining due to contact with acidic solutions such as dilute citric acid, alcohol, and carbonated fluids which might alter its chemical compound, and (h) it is temperature resistant [300° F.], with a Flash Point of 85° to 100° F. Closed Cup.

EXAMPLE

A specimen of existing marble sheet measuring 9"×9" and 3" in thickness was sectioned into thirds with the use of masking tape measuring 1" in width.

The first ⅓ of the specimen was treated in accordance with the present invention comprising the following steps:

Step 1. Industrial solvent was applied to the surface of the marble to remove existing polish and stains.

Step 2. The surface was then honed with an 800 grit of an industrial diamond abrasive to open up the pores and remove any reamining polish.

Step 3. The surface was then rinsed with water.

Step 4. The chemical solvent was applied to remove water and induce deeper drying of the pores.

Step 5. A tack cloth was then used to remove all marble microchips resulting from Step 2 of this process.

Step 6. The moisture-cured polyurethane (Marble Guard) was applied to the surface.

Step 7. The stone was then allowed to dry at room temperature.

The second ⅓ of the specimen was treated in accordance with the known method. There was no honing prior to application of a sealant. The surface was then buffed to obtain a polished surface.

The last ⅓ of the specimen was left untouched.

The specimen marble sheet was left outdoors for a period of one year.

From the comparison between the three sections of the specimen, the results were that the ⅓ left untouched became stained due to exposure to the elements. The ⅓ treated in accordance with the known method was cracked and discolored in some spots and the shine became dull. It is concluded that deterioration occurred due to lack of penetration of the sealant. Impregnation was incomplete because the pores were not sufficiently opened in preparation for the sealant.

The ⅓ that was treated in accordance with the present invention showed no evidence of cracking, chipping, discoloration or dullness in shine. The test proved that the effectiveness of the Marble Guard TM lasts for not less than one year. The Marble Guard was able to withstand the elements and prevent deterioration that occurs due to atmospheric pollutants.

What I claim is:

1. A surface treatment process for preserving and strengthening marble, travertine, limestone, stones, tiles and articles manufactured from such porous solids against staining and degradation caused by atmosphere pollutants and chemical substances comprising the steps of:

applying a solvent to the surface to remove any existing polish, waxes and stains;

honing the surface with abrasive further removing existing polish, waxes and any stains from the surface and opening up the surface pores of said porous solid;

washing the surface with water to remove detritus and loose particles;

drying the surface of said porous solid with a chemical drying solution to remove all moisture from said surface and said pores;

wiping the surface clean to remove all microchips;

applying to the surface a moisture-cured polyurethane mixture which is immiscible with the common organic solvents; and allowing the coated surface to naturally dry at room temperature.

2. A process as in claim 1 wherein said abrasive is in industrial diamond abrasive.

3. A process as in claim 1 wherein said chemical drying solution comprises approximately 80% Xylene; 15% Butyl acetate; 5% Methyl-ISO-Butyl-Ketone and 0.1% moisture absorbing additive.

4. A process as in claim 1 wherein said moisture-cured polyurethane has the formula $C_3H_7NO_2$.

5. A process as in claim 1 wherein said wiping clean is performed with an appropriately treated tack cloth.

* * * * *